United States Patent Office 3,525,761
Patented Aug. 25, 1970

---

3,525,761
DIORGANOTIN DI(THIO CARBOXYLIC ACID ESTERS) AND THE PREPARATION THEREOF
Toshio Seki, Osaka-shi, and Kozaburo Suzuki, Kobe-shi, Japan, assignors to Nitto Kasei Co., Ltd., Osaka, Japan, a corporation of Japan
No Drawing. Original application May 25, 1967, Ser. No. 641,152. Divided and this application June 25, 1969, Ser. No. 852,136
Int. Cl. C07f 7/22
U.S. Cl. 260—429.7      4 Claims

ABSTRACT OF THE DISCLOSURE

Sulfur containing organotin compounds of the formula

$$R_2Sn[S(CH_2)_mCOOCH_2CH_2\overset{OCH_3}{\underset{|}{C}}H-CH_3]_2$$

prepared by the reaction of an ester and a dialkyltin oxide may be used as stabilizers for resins.

---

This application is a division of co-pending application Ser. No. 641,152, filed May 25, 1967, and now abandoned.

This invention relates to novel sulfur containing organotin compounds, to the preparation of such compounds, and to polyvinyl chlorides, copolymers with vinyl chlorides as the main constituent, or these resin-based polyblends, stabilized with said sulfur containing organotin compounds.

There have been heretofore used a number of different types of sulfur-containing organotin compounds known as stabilizers for these resins (as are disclosed in Japanese patent publications Nos. 789/57, and 5,282/59), but these conventional stabilizers may be characterized by unsatisfactory stabilizing ability because of volatilization during the process of producing resins at elevated temperatures, and since they possess a sharp odor characteristic of mercaptan, not only do they make operators feel uncomfortable, but they often give a bad influence to the human body. In addition, as these stabilizers may not prevent a resinous composition containing same from adhering to a roll, and also may not reduce a gelling time, it is hard to conduct operations efficiently or handily for prolonged periods of time without the aid of supplementary stabilizers. Furthermore, halogen containing resins often undergo a change of physical properties (e.g., increasing of fragility) by the addition of these sulfur containing organotin compounds.

According to the present invention, these adverse effects may be reduced or eliminated by employing a new class of sulfur containing organotin compounds as stabilizers.

It is an object of this invention to provide novel sulfur containing organotin compounds and methods of producing such compounds. A further object of this invention is to provide polyvinyl chlorides, copolymers with vinyl chlorides as the main constituent, or these resin-based polyblends, stabilized with these novel sulfur containing organotin compounds. Other objects will be apparent to those skilled-in-the-art from the following description.

In accordance with certain of its aspect, the method of this invention for stabilizing polyvinyl chlorides, copolymers with vinyl chlorides as the main constituent, or these resin-based polyblends against the deteriorating effects of heat and light comprises incorporating into said halogen containing vinyl resins an inhibiting amount of a sulfur containing organotin compound having the following formula

$$R_2Sn[S(CH_2)_mCOOCH_2CH_2\overset{OCH_3}{\underset{|}{C}}H-CH_3]_2$$

wherein R is alkyl of 1–8 carbon atoms, and m represents 1 or 2.

Since a sulfur containing organotin compound employed in the invention has two other linkages in its molecule, it is less volatile than the conventional stabilizers, and the liability of the sulfur containing organotin compound in a resin composition to escape therefrom is much less than that of the conventional stabilizer. The low volatility of the sulfur containing organotin compounds make them especially useful as stabilizers in halogen containing vinyl resin formulations which require heat or exposure to elevated temperatures during use or during the processing of the halogen containing vinyl resin material. At the same time, since the sulfur-containing organotin compounds have both ester and other linkages in their molecules, these novel stabilizers may exhibit a good compatibility with resins and an accelerated gelation; they may make the lowest processable temperature of resins reduced about 5° C. compared with the conventional stabilizers; and resin compositions containing said novel stabilizers may perform over longer periods of time during the heat processing of same. A new class of these compounds also may impart an improved satisfactory stabilizing effect against degradation by light to resins compared with the conventional sulfur-containing organotin compounds which are unstable to light. Besides, there is not practically a disgusting smell of mercaptane during the process of producing stabilized resins, and consequently they do not affect badly to a person.

In accordance with certain aspects of this invention, the method of preparing sulfur-containing organotin compounds comprises the steps of (a) reacting 3-methoxybutanol with a monomercaptocarboxylic acid selected from the group consisting of thioglycolic acid and mercaptopropionic acid by the conventional method to form an ester, (b) heating with stirring said ester and a dialkyltin oxide selected from the group consisting of dimethyltin oxide, dibutyltin oxide, diamyltin oxide, and dioctyltin oxide in the presence (or absence) of an inert solvent, and (c) removing water formed in the reaction.

Only an inhibiting amount of organotin compound is required. Preferably, the amount of the sulfur containing organotin stabilizers to be employed in the process of this invention is in the range of 0.1 to 10 parts by weight per 100 parts by weight of the resins. The stabilizers may be used singly or in combination, and they may also be used together with other known stabilizers, and with other additives such as a mold lubricant, an antioxidant, and a U.V. absorber.

EXAMPLE 1

A three-nooked flask, equipped with a stirrer and a Dean trap, was charged with 1.1 mole of thioglycolic acid, 1 mole of 3-methoxybutanol, 200 ml. of benzene as solvent, and 2.5 g. of p-toluenesulfonic acid as esterification catalyst. This mixture was reacted by the conventional method to form 168 g. (94.5%) of 3-methoxybutyl thioglycolate,

$$(HS\ CH_2COOCH_2CH_2\overset{OCH_3}{\underset{|}{C}}H-CH_3)$$

A three-necked flask, equipped with a stirrer and a Dean trap, was charged with 1 mole of said ester, 0.5 mole of dibutyltin oxide, and benzene as solvent. This mixture was heated with stirring until all the water of reaction was removed. The benzene was then distilled off under reduced pressure to yield 290 g. (98.5%) of dibutyltin-bis-(3-methoxybutyl thioglycollate) (A). The product is a light yellow, transparent liquid. The physical properties: $n_D^{30}=1.5128$; $D_4^{30}=1.271$.

*Analysis.*—Calculated (percent): Sn, 20.2; S, 10.9; C, 45.0; H, 7.5. Found (percent): Sn, 20.6; S, 10.7; C, 45.3; H, 7.4.

To 100 parts by weight of polyvinyl chloride (mean polymerization degree: 1,100) was added 2 parts by weight of said dibutyltin-bis-(3-methoxybutyl thioglycollate) (A). The mixture was sheeted by milling for 5 minutes on a mixing roll heated to 160°±2° C. For comparative purposes, by the same procedure, a sheet was made containing 2 parts by weight of dibutyltin didodecyl mercaptide, $(C_4H_9)_2Sn(SC_{12}H_{25})_2$ (B) as prior art sulfur containing stabilizer in place of the stabilizer of this invention.

The obtained sheets were tested in a Geer oven heated to 180° C. for heat stability, and the discoloration was observed. The same sheets prepared for a weathering test were irradiated for 500 hours in a weatherometer, equipped with a xenon lamp screen by a heat resisting optical glass filter in order to cut off ultraviolet rays below the wavelength of 279 mµ, and the discoloration and the deterioration other than that in appearance were observed. For volatility the stabilizers were tested by weighing precisely each of compounds (A) and (B) in dishes (5 cm. in diameter x 3 cm. in height); heating the dishes to 180° C. in a Geer oven for 1 hour; and measuring the weight loss. Results are shown in the following Table I.

pressure to yield 354 g. (97.3%) of dioctyltin bis-(3-methoxybutyl mercaptopropionate) (C). The product is a light yellow, transparent liquid. The physical properties: $n_D^{30}=1.5039$; $D_4^{30}=1.257$.

*Analysis.*—Calculated (percent): Sn, 16.31; S, 8.8; C, 52.8; H, 8.9. Found (percent): Sn, 16.9; S, 9.1; C, 53.0; H, 8.0.

To 100 parts by weight or copolymer consisting of 95% by weight of vinyl chloride and 5% by weight of vinyl acetate was added 3 parts by weight of said dioctyltin-bis-(3-methoxybutyl mercaptopropionate) (C). The mixture was sheeted by milling for 5 minutes on a mixing roll heated to 150°±2° C. For comparative purposes, by the same procedure, a sheet was made containing 3 parts by weight of dioctyltin-bis-(octyl thioglycollate), $(C_8H_{17})_2Sn(SCH_2COOC_8H_{17})_2$ (D) as prior art sulfur containing stabilizer in place of the stabilizer of this invention.

The obtained sheets were tested in a Geer oven heated to 180° C. for heat stability, and the discoloration was observed. The same sheets prepared for a weathering test were irradiated for 500 hours in a weatherometer, equipped with a xenon lamp screened by a heat resisting optical glass filter in order to cut off ultraviolet rays below the wavelength of 279 mµ, and the discoloration and the deterioration other than that in appearance were observed. For volatility the stabilizers were tested by weighing precisely each of compounds (C) and (D) in

TABLE I

| Stabilizer | Test for heat stability—Color of sheet after— | | | | Test for weatherability | | Heating loss of stabilizer (percent) |
|---|---|---|---|---|---|---|---|
| | 0.5 hr. | 1.0 hr. | 1.5 hrs. | 2.0 hrs. | Color of sheet after 500 hrs. | Appearance of sheet after 500 hrs. | |
| (A) | Colorless | Colorless | Colorless | Light yellow | Colorless | Transparent | 0.8 |
| (B) | do | do | Light yellow | Yellow | Brown | Turbid | 3.0 |

Moreover, in order to prove a good workability of resinous composition containing the stabilizer of this invention, a test was conducted to determine the lowest possible surface temperature of a roll at that a completely gelatinated transparent sheet might be obtained. Processing at 145° C. was sufficient to mtke such a sheet in the case of using stabilizer (A), the sheet being not discolored after blending for 1 hour; whereas, in the case of using stabilizer (B), processing even at 150° C. was not sufficient, the sheet turning yellow after blending only 35 minutes. It is a great advantage to be able to lower a processing temperature by 5° C. in the process of molding heat sensible polyvinyl chlorides.

dishes (5 cm. in diameter x 3 cm. in height); heating the dishes to 180° C. in a Geer oven for 1 hour; and measuring the weight base. Results are shown in Table II.

TABLE II

| Stabilizer | Test for heat stability—Color of sheet after— | | | | Test for weatherability | | Heating loss of stabilizer (percent) |
|---|---|---|---|---|---|---|---|
| | 0.5 hr. | 1.0 hr. | 1.5 hrs. | 2.0 hrs. | Color of sheet after 500 hrs. | Appearance of sheet after 500 hrs. | |
| (C) | Colorless | Colorless | Light yellow | Light yellow | Colorless | Transparent | 0.6 |
| (D) | do | do | do | Yellow | Brown | Opaque | 2.5 |

Moreover, in order to prove a good workability of resinous composition containing the stabilizer of this invention, a test was conducted to determine the lowest possible surface temperature of a roll at that a completely gelatinated transparent sheet might be obtained. Processing at 145° C. was sufficient to make such a sheet, not discolored after 1 hour blending, in the case of using stabilizer (C); whereas, in the case of using stabilizer (B), processing oven at 150° C. was not sufficient, the sheet turning yellow after the resinous composition was blended only 28 minutes. It is a great advantage to be able to lower a processing temperature by 5° C. in the process of molding heat sensible polyvinyl chlorides.

Although this invention has been illustrated by reference to specific examples, numerous changes and modifications thereof which clearly fall within the scope of the invention will be apparent to those skilled in the art.

What is claimed is:

1. The compound having the formula

EXAMPLE 2

A three-necked flask, equipped with a stirrer and a Dean trap, was charged with 1.1 mole of mercaptopropionic acid, 1 mole of 3-methoxybutanol, 200 ml. of benzene as solvent, and 2.5 g. of p-toluenesulfonic acid ts esterification catalyst. This mixture was reacted by the conventional method to form 186 g. (96.9%) of 3-methoxybutyl mercaptopropionate,

A three-necked flask, equipped with a stirrer and a Dean trap, was charged with 1 mole of said ester, 0.5 mole of dioctyltin oxide, and benzene as solvent. This mixture was heated with stirring until all the water of reaction was removed. The benzene was then distilled off under reduced

wherein R is alkyl of 1–8 carbon atoms, and $m$ represents 1 or 2.

2. The compound as claimed in claim 1, dibutyltin-bis-(3-methoxybutyl thioglycollate).

3. The compound as claimed in claim 1, dioctyltin-bis-(3-methoxybutyl mercaptopropionate).

4. The method of preparing the compound of claim 1 which comprises the steps of
(a) reacting 3-methoxybutanol with a monomercaptocarboxylic acid selected from the group consisting of thioglycolic acid and mercaptopropionic acid to form an ester,
(b) heating with stirring said ester and a dialkyltin oxide selected from the group consisting of dimethyltin oxide, dibutyltin oxide, diamyltin oxide, and dioctyltin oxide, and
(c) removing water formed in the reaction.

References Cited

UNITED STATES PATENTS

| 2,832,750 | 4/1958 | Weinberg | 260—429.7 X |
| 3,029,267 | 4/1962 | Berenbaum et al. | 260—429.7 |
| 3,478,071 | 11/1969 | Weisfeld | 260—429.7 |

TOBIAS E. LEVOW, Primary Examiner

W. F. W. BELLAMY, Assistant Examiner

U.S. Cl. X.R.

260—45.75